Feb. 1, 1966           T. A. BYLES           3,233,178
VEHICULAR RADIO RECEIVER WITH SPEED COMPENSATED VOLUME CONTROL
Filed Dec. 5, 1962
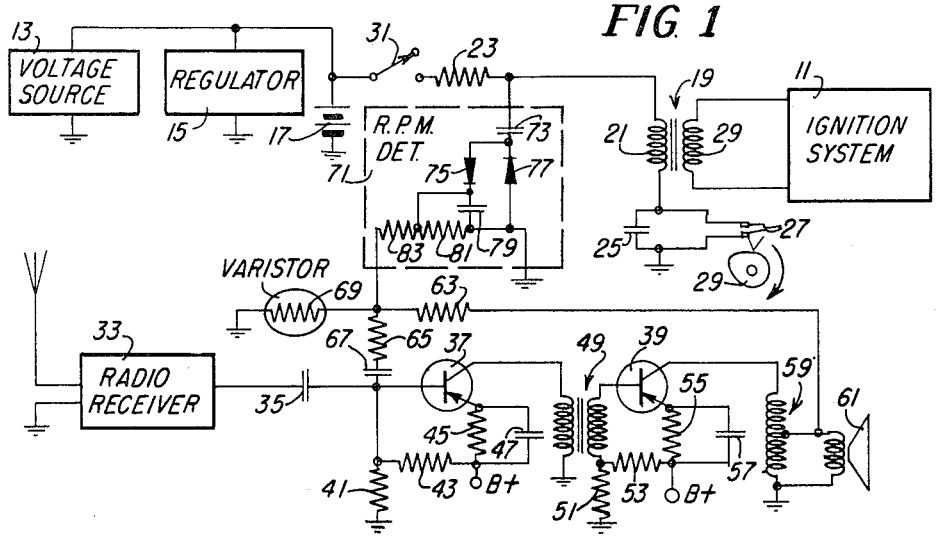
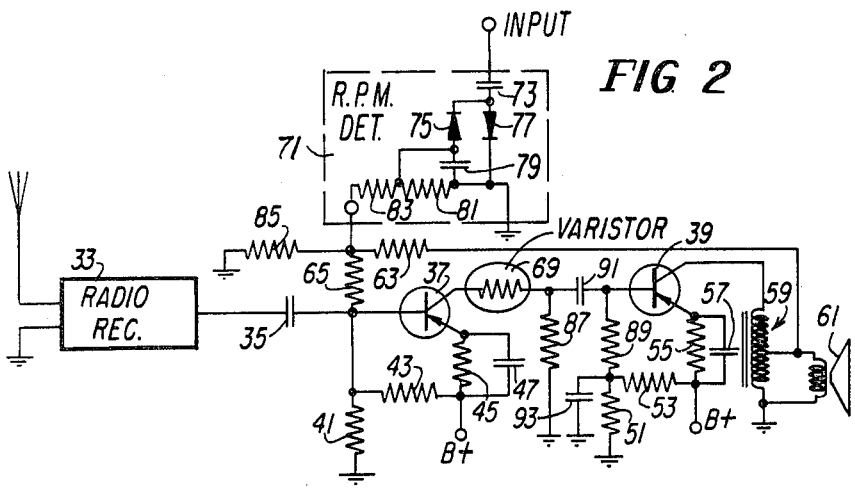
INVENTOR.
THEODORE A. BYLES
BY Mueller & Aichele
ATTYS.

3,233,178
Patented Feb. 1, 1966

3,233,178
VEHICULAR RADIO RECEIVER WITH SPEED COMPENSATED VOLUME CONTROL
Theodore A. Byles, Villa Park, Ill., assignor to Motorola, Inc., Chicago, Ill., a corporation of Illinois
Filed Dec. 5, 1962, Ser. No. 242,527
6 Claims. (Cl. 325—406)

This invention relates to a volume control circuit for an automobile radio receiver, and more particularly to an automobile radio receiver in which the output of an audio amplifier stage thereof is controlled in accordance with the speed of the automobile.

One of the major difficulties in automobile radio reception arises from the fact that as the speed of the automobile increases, engine, road and wind noises increase as well. This means that in order to hear clearly over the increased noise, the volume of the receiver must be increased proportionally. Numerous ways have been proposed to increase this volume automatically according to the speed of the automobile. Volume control devices have been coupled to the ignition system of the automobile but these have been objectional in that they have disturbed the ignition system by tapping off the necessary control voltage for the automatic volume control down near the breaker points. Furthermore, many speed compensated volume control systems tend to be complex and expensive.

Accordingly, an object of this invention is to provide an improved speed compensated volume control for use in an automobile radio receiver.

Another object of the invention is to provide a speed compensated automatic volume control for an automobile radio receiver, which is simple and low in cost.

Still another object of the invention is to provide a speed compensated automatic volume control for an automobile radio receiver which control utilizes a voltage tap which will not disturb the ignition system and which is easily connected thereto.

A feature of the invention is the provision, in a radio receiver for an automobile, of a varistor coupled in a signal path of the audio amplifier to affect the output thereof according to an applied control voltage which is roughly proportional to the speed of the automobile.

Another feature of the invention is the provision, in an automobile radio receiver, of a varistor connected to attenuate a negative feedback circuit according to an applied control voltage which is proportional to the speed of the automobile.

Still another feature of the invention is the provision, in an automobile radio receiver having a transistor audio amplifier stage, of a varistor connected in the collector circuit of the transistor stage to vary the output thereof according to a control voltage applied to the varistor, which voltage is roughly proportional to the speed of the automobile.

A further feature of the invention is the provision, in a varistor controlled audio amplifier for an automobile radio receiver, of an r.p.m. detector tap connected to the electrical system of the automobile at a point which will not disturb the ignition functions.

In the drawing:
FIG. 1 is a schematic diagram of a circuit constructed in accordance with the invention; and
FIG. 2 is a schematic diagram of a second embodiment of the invention.

In accordance with the invention, a radio receiver for an automobile, which receiver has an audio amplifier, is provided with a varistor connected in the audio amplifier to control the output thereof. An r.p.m. detector is coupled from the pulsing unit of the automobile to the varistor to provide a control voltage therefor which is proportional to the speed of the automobile. In one embodiment of the inevntion the varistor is used to attenuate a negative feedback signal for the amplifier while in another version of the invention the varistor is used in the output circuit of one of the amplifier stages to control the A.C. signal therefrom.

Referring now to the drawings, there is shown in FIG. 1 a portion of the electrical system of a vehicle utilizing an internal combustion engine. This electrical system includes an ignition system 11, a D.C. voltage source 13 which may be a generator or alternator, and a regulator 15 for controlling the output of the voltage source. Also provided is a storage battery 17 and an ignition transformer 19. The primary coil 21 of transformer 19 is connected to the voltage source and the storage battery through ballast resistor 23, and is connected to ground through a pulse producing unit which includes capacitor 25, breaker points 27 and breaker cam 29. As an alternative, any type of pulse producing unit might be used such as a magneto or an inductive pulsing unit. Secondary coil 29 of transformer 19 couples the high voltage pulses to the ignition system. The circuit may be opened or closed by an ignition switch 31.

Also shown in FIG. 1 is a radio receiver 33, which may include the usual amplifier and detector stages to provide an audio frequency output. This output is coupled through capacitor 35 to the audio amplifier, which includes transistors 37 and 39. Transistor 37 is provided with a bias network which includes resistors 41, 43 and 45 and capacitor 47. The collector electrode of transistor 37 is connected to the primary side of coupling transformer 49. The base electrode of transistor 39 is coupled to the secondary side of transformer 49, and transistor 39 is forward biased by means of resistors 51, 53 and 55 and capacitor 57. The collector electrode of transistor 39 is coupled through the usual output transformer 59 to speaker 61, which may be mounted in the interior of the automobile.

A feedback connection is provided from the secondary of transformer 59 through resistors 63 and 65 and capacitor 67 to the base of transistor 37. This connection provides negative feedback for the audio amplifier decreasing its gain.

Attenuation of this negative feedback connection is provided by varistor 69, which is connected from the juncture between resistors 63 and 65 to ground. An r.p.m. detector provides control current for varistor 69. This detector 71 includes a capacitor 73, and a pair of diodes 75 and 77. Capacitor 79 and resistor 81 are connected to provide a time delay discharge which is coupled through resistor 83 to varistor 69. The time delay is to prevent rapid changes in volume during normal variations in throttle opening, and will only permit the detector 71 to affect the volume control after the throttle has been open a sufficient length of time to appreciably increase the speed of the automobile. Detector 71 is connected to the juncture between ballast resistor 23 and coil primary 21. Thus, the detector 71 is effectively isolated from the ignition system 11 by using ballast resistor 23 to develop pulse voltages so that the connection has a minimum effect on the operation of the ignition system.

As the speed of the vehicle increases, pulses are supplied to the ignition system at an increasingly faster rate. These pulses are detected by the r.p.m. detector 71, which after a given time delay, produces a D.C. output through varistor 69 to ground. Varistor 69 has an alternating current resistance that is dependent on the direct current which passes through it. As speed increases, pulses are produced more rapidly by the pulsing unit which increases the bias current through varistor 69, dropping the A.C.

resistance thereof and thus attenuating the feedback signal to the base of transistor 37. This increases the output of the audio frequency amplifier to compensate for greater road and engine noise at high speeds.

Referring now to FIG. 2, a second embodiment of the invention is shown. The polarity of the diodes 75 and 77 in r.p.m. detector 71 has been reversed to produce a negative D.C. bias according to the speed of the vehicle. Varistor 69 has been moved from its position in the feedback circuit and has been replaced by resistor 85. Varistor 69 has been placed in the collector circuit of transistor 37. Transistors 37 and 39 are RC coupled by means of resistors 87 and 89 and capacitor 91. A capacitor 93 is added to the bias circuit for transistor 39.

The result of this arrangement is that as speed increases, the bias on the base of transistor 37 also increases causing transistor 37 to conduct more D.C. from the B+ source. This drops the A.C. resistance of varistor 69, permitting more A.C. signal to be passed to the base of transistor 39, thereby increasing the output of the audio amplifier according to the speed of the vehicle.

It may therefore be seen that the invention provides an improved speed compensated automatic volume control for an automobile radio receiver, which is low in cost, simple of construction, and which does not disturb the ignition system in tapping off the control voltage.

I claim:

1. In a vehicle utilizing an internal combustion engine and having a voltage source, the combination of an ignition system and pulsing means for supplying high voltage pulses thereto, a ballast resistor for connecting the voltage source to said ignition system, radio receiver reception means providing an audio frequency output from received radio frequency signals and including an audio amplifier, varistor means connected in said audio amplifier to control the output thereof, and means providing a direct current output according to the frequency of applied signals connecting said varistor to the juncture between said ballast resistor and said ignition system to provide a control current for said varistor proportional to the speed of the vehicle, whereby the output of said audio amplifier is increased as the speed of the vehicle increases.

2. In a vehicle utilizing an internal combustion engine having an ignition system and pulsing means for supplying high voltage pulses thereto, a radio receiver, including in combination, reception means providing an audio frequency output from received radio frequency signals, an audio amplifier connected to the output of said reception means and having input and output sides, conductor means coupling said output side to said input side for providing negative feedback of the output signals of said audio amplifier, attenuating means including a varistor connected to said conductor means, and detector means providing a direct current output according to the frequency of applied signals adapted to couple the pulsing means to said varistor to provide a control current for said varistor proportional to the speed of the vehicle, whereby attenuation of the signal in said conductor means is increased with the speed of the vehicle increasing the output of said audio amplifier.

3. In a vehicle utilizing an internal combustion engine having an ignition system and pulsing means for supplying high voltage pulses thereto, a radio receiver, including in combination, reception means providing an audio frequency output from received radio frequency signals, an audio amplifier connected to the output of said reception means and including a transistor stage having base, emitter and collector electrodes, a varistor coupled to the collector of said transistor, and detector means providing a direct current output according to the frequency of applied signals adapted to connect the pulsing means to said base of said transistor to increase the forward bias on said transistor as the speed of the vehicle increases, whereby the resultant increased direct current in said collector of said transistor decreases the alternating current resistance of said varistor to increase the output of said audio amplifier.

4. In a vehicle utilizing an internal combustion engine, the combination of, a voltage source and an ignition system including a pulsing unit for producing pulses from said voltage source for the internal combustion engine, a ballast resistor series connecting said voltage source to said ignition system, radio receiver means including an audio frequency amplifier having input and output sides, conductor means coupling said output side to said input side for providing negative feedback of the output signals of said audio amplifier, a varistor connected from said conductor means to ground, an r.p.m. detector providing a direct current output according to the frequency of pulses applied thereto, said detector being connected from the juncture between said ignition system and said ballast resistor to said varistor to provide a control current for said varistor which is proportional to the speed of the vehicle, whereby attenuation of the signal in said conductor means is increased with the speed of the vehicle, increasing the output of said audio amplifier.

5. In a vehicle utilizing an internal combustion engine, the combination of, a voltage source and an ignition system including a pulsing unit for supplying ignition pulses from said voltage source for firing the internal combustion engine, a ballast resistor connecting said voltage source to said ignition system, a radio receiver having an audio amplifier including a transistor having base, emitter and collector electrodes, a varistor connected to said collector electrode, and an r.p.m. detector providing a direct current output according to the frequency of pulses applied thereto, said detector being connected from the juncture between said ignition system and said ballast resistor to the base of said transistor to provide a forward bias thereto which is proportional to the speed of the vehicle, whereby the resultant increased direct current in the collector of said transistor decreases the alternating current resistance of said varistor to increase the output of said audio amplifier.

6. In a vehicle having pulsing means producing pulses at a frequency corresponding to the speed of the vehicle, a radio receiver, including in combination, means providing an audio frequency signal from received radio frequency signals and including an audio amplifier having a transistor stage and a signal path for the audio frequency signals, a varistor coupled to said transistor stage in said audio frequency signal path to control the impedance thereof to audio frequency signals, and detector means providing a direct current output according to the frequency of applied signals adapted to couple the pulsing means to said varistor to provide a control current for said varistor proportional to the speed of the vehicle, said varistor being responsive to the control current applied thereto by said detector means to vary the impedance of said audio frequency signal path in accordance with the speed of the vehicle and thereby vary the output of said audio amplifier in proportion to the speed of the vehicle.

References Cited by the Examiner

UNITED STATES PATENTS 2,834,877   5/1958   Milwitt _____ 325—411
2,973,432   2/1961   Hill _____ 325—406

ROBERT H. ROSE, *Primary Examiner.*

DAVID G. REDINBAUGH, *Examiner.*